Aug. 19, 1958  R. O. STURDY ET AL  2,847,946
FREIGHT LOADING APPARATUS
Filed Feb. 23, 1955  2 Sheets-Sheet 1
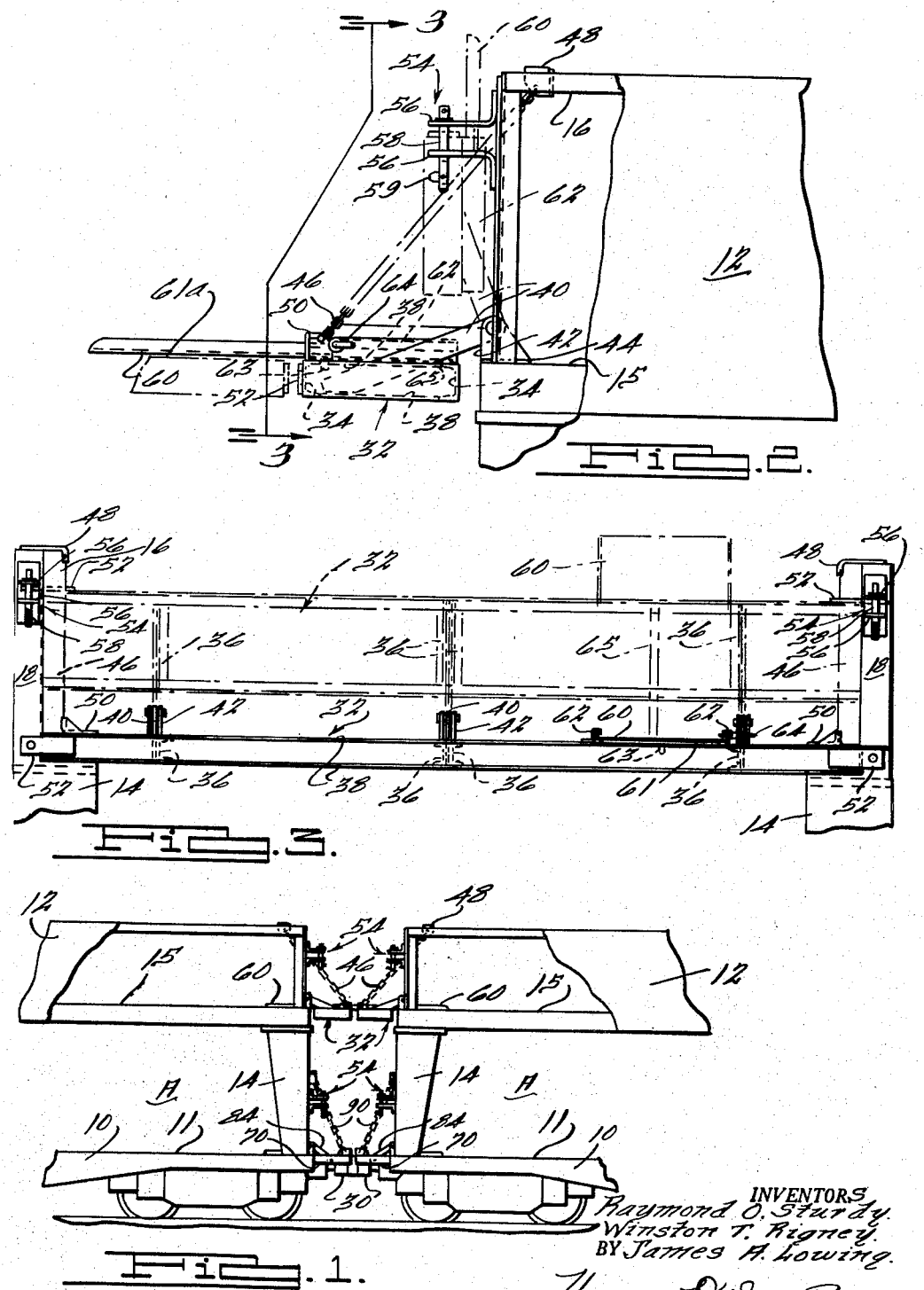

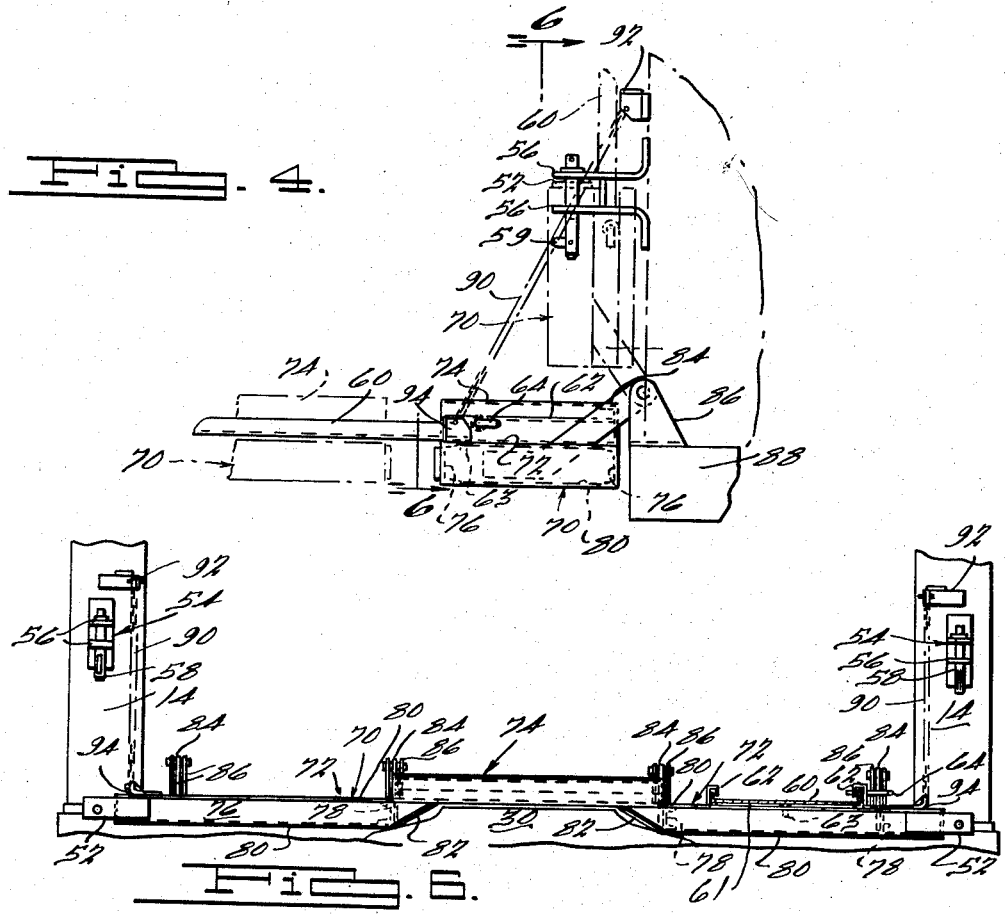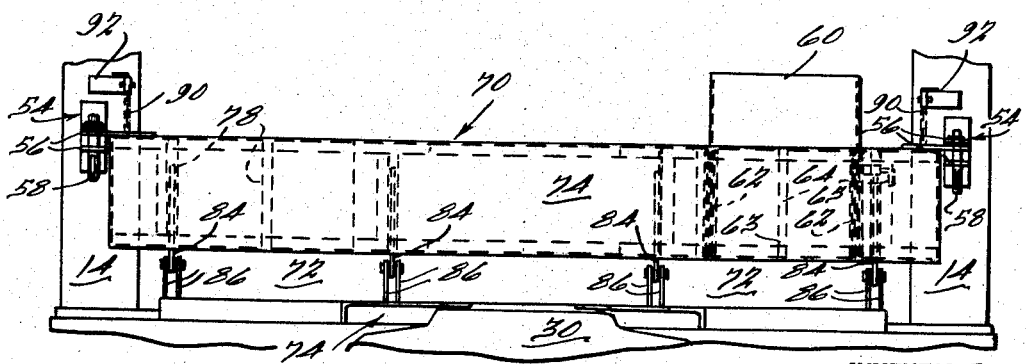

United States Patent Office 2,847,946
Patented Aug. 19, 1958

2,847,946

FREIGHT LOADING APPARATUS

Raymond O. Sturdy, Detroit, Winston T. Rigney, Livonia, and James A. Lowing, Plymouth, Mich., assignors to Evans Products Company, Plymouth, Mich., a corporation of Delaware Application February 23, 1955, Serial No. 490,054

3 Claims. (Cl. 105—368)

The present invention relates generally to freight loading apparatus for the rail transportation of vehicles. More specifically, the present invention relates to a freight loading apparatus comprising a double-decked, open-type railway car for hauling passenger-type vehicles, small trucks, etc. which is provided with suitable ramps to permit simultaneous loading of both decks in circus fashion.

Rail transportation of the smaller types of automobiles and small trucks has been carried out heretofore in closed-type rail cars wherein the vehicles are loaded through wide doors located at either end or at the middle of the car. In order to get a greater number of vehicles into such cars they are stacked on inclined tracks or racks with the hood of one vehicle under the preceding vehicle, etc. Loading such rail cars is a difficult, slow operation, each car having to be separately loaded and each vehicle secured in the stacking pattern before another can be moved into position.

It is an object of this invention, therefore, to provide an open-type rail car which facilitates the loading of vehicles through the sides and ends of the car.

Another object of this invention is to provide an open-type rail car capable of circus-style loading of vehicles under their own power.

Another object of this invention is to provide an open-type, multiple-decked rail car capable of circus-style loading on each deck.

Another object is to provide a rail car of the type described having a ramp on each end of each loading deck which can be lowered for loading purposes and raised and locked in a vertical position to function as a safety barrier for the vehicles on the deck.

These and other objects and advantages will be apparent, or will become apparent, in the more detailed description of the invention to follow when taken in conjunction with the accompanying drawings, in which:

Figure 1 is a fragmentary side elevational view of two double-decked cars of the invention coupled together and their ramps lowered in loading position;

Fig. 2 is an enlarged fragmentary side view showing the ramp on the upper deck in the extended position and indicating in phantom outline the position it would occupy in the raised or barrier position;

Fig. 3 is an enlarged end view, partially in section, of the upper deck loading ramp, and showing in phantom outline, the ramp in the raised position, the view being taken generally along the line 3—3 of Fig. 2;

Fig. 4 is an enlarged fragmentary side view with portions broken away and in section of the ramp on the lower deck and indicating in phantom outline the position it occupies when raised;

Fig. 5 is an enlarged end view of the lower deck ramp which is shown in the "up" or barrier position; and Fig. 6 is an end view with portions of the lower deck ramp in the down or extended position, the view being taken generally along the line 6—6 of Fig. 4.

The invention is shown in connection with flat cars on which a superstructure is mounted to form a double level or deck and in accordance with the invention these are provided with a combination barrier-ramp on each end of each deck which can be lowered so that a string of such rail cars can be loaded circus-fashion, both decks being loaded simultaneously, if desired. When the cars are loaded with vehicles each barrier-ramp can be raised and secured in position to function as a safety retainer should the fastenings of the individual vehicles work loose in transit.

Referring now to the drawings, and particularly Fig. 1 thereof, an ordinary railroad flat car 10 is provided with a superstructure so that three automobiles may be supported on an upper level or deck along with three automobiles carried on the flat car flooring or lower deck 11. This superstructure is described in detail and claimed in a copending application of George M. Schueder et al., filed February 11, 1955, Serial No. 487,518, and assigned to the assignee hereof. The superstructure includes side shear beams 12 supported on vertical columns 14. Between the beams 12 there is secured a pair of spaced-apart channel-like members (not shown) which provide tread surfaces 15 for vehicles driven onto the upper deck. As pointed out in more detail in said copending case, vehicles can be loaded on the lower deck 11 through the end (between columns 14) or through the side openings "A" between the columns. Likewise vehicles can be loaded on the upper deck through the space 16 between the ends of beams 12 either by driving the cars directly onto the upper level 15 or by driving them up an inclined ramp from the lower level 11. When a number of such rail cars are coupled together by couplers 30, vehicles may be driven onto either deck under their own power and then driven down the entire length of the string of cars in circus fashion.

To facilitate loading in this fashion each end of each deck is provided with a combination barrier-ramp which in the "up" position closes the opening 16 but which can be lowered to bridge the gap between adjacent coupled cars. The construction of the ramps for the two decks varies slightly due to the necessity of providing clearance for the flat car coupling members 30 on the lower deck as will be described later on in connection with Figs. 4 to 6. The upper ramp, however, is shown in greater detail in Figs. 2 and 3. The upper level barrier-ramp 32 comprises a hollow, rectangular flat member made up of two small longitudinal side channels 34 and a number of transverse members 36 of channel cross section to all of which are attached top and bottom plates 38. The ramp 32 is pivoted on three hinge arms 40, each of which is rigidly attached on one end to one of the transverse channels 36 and pivoted on its other end to a hinge bracket 42 attached to the upper deck surface 44. To support the weight of the ramp and of a vehicle passing thereover when in the loading or horizontal position a chain 46 on each side of the ramp is provided, the chains 46 being secured on their upper ends in chain brackets 48 attached to the tops of side beams 12 and on their lower ends to like brackets 50 attached to the surface of the upper ramp plate 38.

The upper deck ramp 32 is shown in the lowered position (in solid outline), and in the raised position in phantom outline, in Figs. 2 and 3. As will be seen most clearly in Fig. 3 the ramp 32 is provided on each outer corner with a welded-on pin plate 52 having a hole in it. When the ramp 32 is raised 90 degrees to a vertical position the pin plates 52 come between the members of a toggle pin bracket 54 comprising two bracket strips or legs 56 welded to the side rail leg member 18 and having a conventional type toggle pin 58 with pivotal locking ear 59 passed therethrough. The pin 58 can be withdrawn from the bracket, the holes in pin plates 52 brought into alignment with holes in the bracket members 56 and the pins 58 then replaced to lock the ramp in the raised or barrier position.

It is impractical to make the ramps or barriers 32 sufficiently wide to span half the normal distance between adjacent coupled cars. The coupling members 30 of rail cars have a certain amount of spring resisted telescoping motion for shock absorbing purposes in their construction. The couplings between adjacent railroad cars may be compressed to their limit or fully extended depending on conditions pertaining when the railroad cars come to rest. In addition to the variation between cars due to coupling position is the possibility of the cars being on a curved siding, thus canting the cars at an angle to each other and reducing the spacing between the inner corners and increasing the spacing on the outer corners. In providing for this variable play the ramps are preferably less than about one half the minimum width of the space between adjacent coupled cars and are each provided with a single ramp extension member 60 centered at about one half the normal vehicle tread distance from the longitudinal center line of the car, the members 60 at opposite ends of the car being located on opposite sides of the center line so that one is in line with wheels on one side of a stowed automobile and the other is in line with the wheels on the other side. Each extension 60 comprises a trough-like piece of sheet steel which is slidably supported in a pair of slide guides 62 for longitudinal movement, the guides 62 being fixed on the top surface 38 of the ramp 32 and the extension 60 resting on a fixed slide plate 61, also secured to ramp 32, which elevates the bottom of slide 60 a slight amount 61a above the surface of the adjacent ramp 32 as will be seen in Fig. 1. This slight elevation avoids the possibility that in extending the slide 60 it will butt the end of barrier 32 but still permits elastic deflection under load to contact the upper deck. The extension slide member 60 also has a downwardly projecting finger-like member 63 disposed in closed end registering slot 65 in the upper plate 38 and in plate 61 to further guide the extension and make it slide smoothly in the guides 62 and limit its inward and outward travel. A latch pin 64 is passed through a hole in one of the slide guides 62 to pass behind the back end of slide 60 and thus is in a position to hold the extension member in an extended position. Each barrier-ramp 32 is provided with but one such extension member, and the ramps on each end of each deck have such extensions on opposite sides of the center line of the car, so that opposed ramps of adjacent coupled cars can be brought together to form two treadways for vehicles passing thereover.

The lower ramp 70 is of similar construction but is not flat in design due to the necessity to bridge the coupling member 30 on the car. As will be seen in Fig. 6, the lower ramp 70 is formed of two side sections 72 at deck level height and a raised center section 74. Each of the side sections 72 is made up of side chanels 76 and several transverse channel members 78 and covered on top and bottom with flat plates 80. The raised center section 74 is of similar construction. The side sections 72 and raised center section 74 are secured together by welding and by gusset plates 82 welded into the corners.

The lower deck ramps 70 are pivoted on four hinge arms 84 secured on one of their ends to certain of the transverse members 78 and pivoted on their other ends on hinge brackets 86 which are welded or bolted to the lower deck sill member 88. On each side of each ramp a pair of supporting chains 90 are secured to chain brackets 92 on the upper deck support columns 14 and to brackets 94 on the ramp plates 80. Toggle pin plates 52 similar to those of the upper deck ramps 32 are secured to outer corners of the lower deck ramps 70, and toggle pin brackets 54 are secured to the corner columns 14, in a fashion similar to that of the upper deck. When the ramp is raised to a vertical position the toggle pins 58 are passed through plates 52 and bracket plates 56 and ears 59 extended to lock the ramp in the raised or barrier position.

As with the upper deck ramps, those of the lower deck are provided with an extension member 60 sliding in guides 62 and having a downwardly-projecting finger 63 fitted into a slot 65 in the surface of the section 72 and a latch pin 64 passed through one of the guides 62 to lock it in the extended position. Only one such extension is provided on each lower ramp, the extensions being located on opposite sides of the car center line on opposite ends of the lower deck.

With the rail car of the present invention, loading of both decks can proceed with great speed and dispatch. A plurality of coupled cars can be positioned at loading terminal and with the ramps 32 and 70 of all cars on both decks lowered into position, automobiles can be driven onto the first car under their own power and then, circus-fashion, driven the entire length of the line to load the last car in the line first. If a double-decked loading ramp is available, or a suitable elevating device, vehicles can be loaded circus-fashion on both decks simultaneously. As each car is loaded, the ramps on each end of the car are raised to form end barriers providing protection for the shipped automobiles and for personnel on the railroad cars.

Various modifications can, of course, be made in the structure illustrated without departing from the spirit and scope of the invention.

What is claimed is:

1. A railway car comprising a substantially flat, deck-like surface, an open end on each end of said surface, a retractable ramp secured across substantially the full width of each end of said surface, each said ramp being a structural member hinged to the end of the car so as to swing down to a horizontal position to form an extension of said surface of a width less than half the normal distance between like coupled cars and to swing to a vertical barrier position across the car, means for supporting said ramp in said horizontal position, means to lock said ramp in said vertical position, a tread-like extension member slidably journalled on what is the upper surface of said ramp, when in said horizontal position, and having slide guides secured to said upper surface, a finger-like guide member journalled in a slot in said upper surface, and means for holding said member in an extended position so as to rest on a like ramp of the next adjacent car, each said ramp having only one said extention member extending longitudinally of the car and located at about one-half a normal vehicle tread distance from the longitudinal center line of the car and said extension members on opposite ends of said deck-like surface being on opposite sides of the longitudinal center line of said car.

2. A rail car as defined in claim 1 and further characterized in that said ramp has an integral, raised center portion to provide clearance over the coupling members of said car.

3. A rail car comprising a flat, open-deck railway car, an upper deck supported over the flat lower deck of said car, corner support columns for said upper deck, substantially open sides on said lower deck, open ends on each end of each deck, corner members projecting upwardly from said upper deck, a retractable ramp on each end of each deck of a width less than half the normal distance between like coupled cars, the ramps on each end of said lower deck having a raised center portion to provide clearance for the coupling members of said car, each of said upper and lower deck ramps being hinged to its respective deck so as to swing to a horizontal position forming a continuation of said deck and to a vertical position across the corner members on each deck, means for supporting said ramps in said horizontal position, means on each said corner column and member for locking said ramps thereacross in the said vertical position, and a single extension member slidably journalled in slide guides secured to what is the upper ramp surface when in said horizontal position, of each said ramp and having a downwardly projecting guide finger fitted into a slot in said upper surface and a pin passed through one of said slide guides to hold said extension member in an extended position, said extension members being positioned lengthwise of the car length at substantially half a vehicle tread distance from the longitudinal center line of said car and on opposite sides of said center line on the ramps of the same deck.

References Cited in the file of this patent

UNITED STATES PATENTS

| | | |
|---|---|---|
| 144,804 | Strode | Nov. 18, 1873 |
| 1,898,679 | Millee | Feb. 21, 1933 |
| 2,052,867 | Cartzdafner | Sept. 1, 1936 |
| 2,527,653 | Pierce | Oct. 31, 1950 |

FOREIGN PATENTS

| | | |
|---|---|---|
| 295,736 | Great Britain | Aug. 20, 1928 |